(12) United States Patent
Louwerse

(10) Patent No.: US 9,396,666 B2
(45) Date of Patent: Jul. 19, 2016

(54) SYSTEM AND METHOD FOR DYNAMICALLY APPLYING LINE BREAKS IN TEXT

(76) Inventor: Max M. Louwerse, Ulvenhout (NL)

( * ) Notice: Subject to any disclaimer, the term of this patent is extended or adjusted under 35 U.S.C. 154(b) by 0 days.

(21) Appl. No.: 12/957,096

(22) Filed: Nov. 30, 2010

(65) Prior Publication Data

US 2012/0053928 A1 Mar. 1, 2012

(51) Int. Cl.
 *G06F 17/27* (2006.01)
 *G09B 7/04* (2006.01)
(52) U.S. Cl.
 CPC ........................................ *G09B 7/04* (2013.01)
(58) Field of Classification Search
 USPC .............................................................. 704/9
 See application file for complete search history.

(56) References Cited

U.S. PATENT DOCUMENTS

| | | | |
|---|---|---|---|
| 6,766,495 B1 * | 7/2004 | Bates et al. ................... 715/201 |
| 7,069,508 B1 * | 6/2006 | Bever et al. ................... 715/234 |
| 7,346,489 B1 * | 3/2008 | Bever et al. ....................... 704/4 |
| 7,580,838 B2 * | 8/2009 | Divay et al. ................... 704/257 |
| 7,668,718 B2 * | 2/2010 | Kahn et al. .................... 704/270 |
| 2002/0091713 A1 * | 7/2002 | Walker ............................ 707/200 |
| 2002/0107894 A1 * | 8/2002 | Kent et al. ..................... 707/517 |
| 2003/0068603 A1 * | 4/2003 | Cupp ............................. 434/178 |
| 2008/0059187 A1 * | 3/2008 | Roitblat et al. ............... 704/257 |
| 2008/0140401 A1 * | 6/2008 | Abrash et al. ................. 704/251 |
| 2008/0140411 A1 * | 6/2008 | Millman et al. ............... 704/270 |
| 2010/0199195 A1 * | 8/2010 | Carounanidy et al. ........ 715/760 |

* cited by examiner

*Primary Examiner* — Timothy Nguyen
(74) *Attorney, Agent, or Firm* — W. Edward Ramage; Baker Donelson

(57) ABSTRACT

A system and method for analyzing a text, and automatically applying line breaks according to set page, text and reader parameters in order to optimize reading speed and comprehension. Line breaks in the text are determined in part using semantic principles, i.e., the strength of the semantic relation between the words in a sentence, or word co-occurrence frequency. Other factors include the size of the page or screen (for both offline and online reading), and the width of the margins (which establish the maximum length of a line, depending on character font and size). The present invention increases reading comprehension over various other line break methods.

10 Claims, 2 Drawing Sheets

Cancer
begins in
genes,
bits of
biochemical
instructions
composed of individual
segments of the long,
coiled
molecule
deoxyribonucleic acid
(DNA).

Genes contain the
instructions to make
proteins,
molecular
laborers that
serve as
building blocks of
cells,
control
chemical reactions, or
transport materials to and from
cells.

In a
cancerous cell,
permanent
gene
alterations, or
mutations, cause the
cell to
malfunction.

For a
cell to become
cancerous,
usually three to
seven different
mutations must occur in a single cell.

FIGURE 2

SYSTEM AND METHOD FOR DYNAMICALLY APPLYING LINE BREAKS IN TEXT

FIELD OF INVENTION

This invention relates to a system and method for dynamically analyzing text and applying line breaks according to a variety of parameters.

BACKGROUND OF THE INVENTION

The layout of text being read affects comprehension and time. Line length is an important factor in reading time and comprehension in reading. In general, very short and very long line lengths slow down reading speed because of the disruption of normal eye movements.

A special method for text layout, Visual Syntactic Text Format (VSTF), has been disclosed in U.S. Pat. No. 5,802,533, which is incorporated herein in its entirety by specific reference for all purposes. Lines in a text are truncated on the basis of syntactic principles, and the level of the syntactic phrase in the sentence determines the indentation of a line. It has been shown that the VSTF layout results in an improvement in reading proficiency.

SUMMARY OF INVENTION

In various embodiments, the present invention comprises a system and method that analyzes a text, and automatically applies line breaks according to set page, text and reader parameters in order to optimize reading speed and comprehension. Line breaks in the text are determined in part using semantic principles, i.e., the strength of the semantic relation between the words in a sentence. Other factors include the size of the page or screen (for both offline and online reading), and the width of the margins (which establish the maximum length of a line, depending on character font and size). The present invention increases reading comprehension over various other line break methods, including standard line breaks determined by page or screen layout, random truncation (i.e., truncating a line randomly before a standard random line break), or VTSF text truncated according to syntactic units (i.e., sentence structure).

In one exemplary embodiment, the invention inserts dynamic line breaks according to meaningful relationships between words, using word order frequencies and breaking a line when the word order frequency reaches an established threshold. The threshold, and thus the line breaks, can be set according to the page width available. If a page or screen only allows for a limited number of words on a line, for example, the semantic threshold can be set higher so that line breaks occur earlier or more frequently. This is of importance for personal digital assistants (PDAs), smart phones, and similar devices (e.g., iPods, iPads, and reading devices). Thus, any given text may have line breaks at different points, depending on the device or means used for reading the text.

DESCRIPTION OF THE DRAWINGS

FIG. 2 shows an example of text that has been processed.

DETAILED DESCRIPTION OF EXEMPLARY EMBODIMENTS

Figure 1:
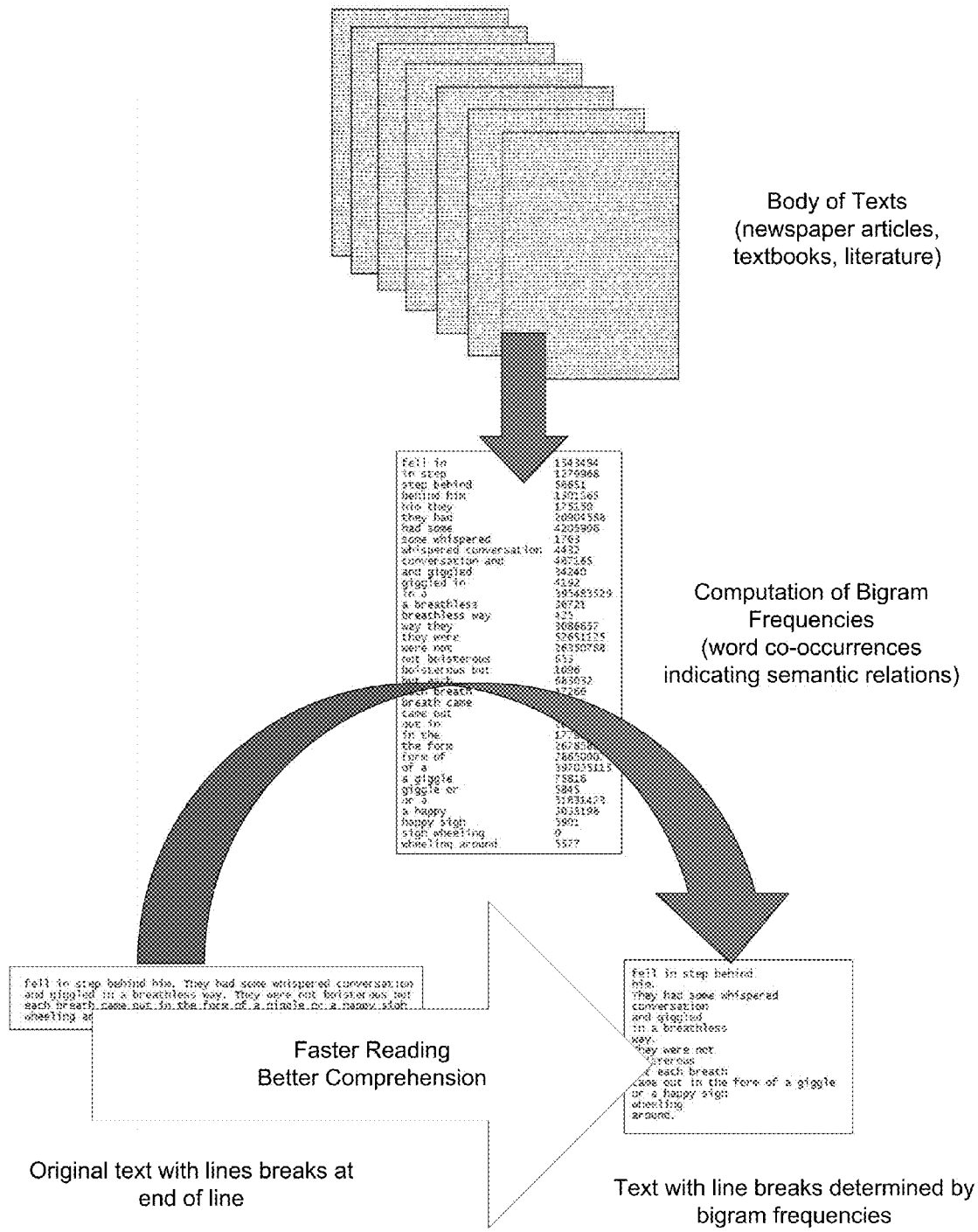
FIG. 1 shows a view of method steps in accordance with an embodiment of the present invention.

In various embodiments, the present system analyzes a text, and automatically applies line breaks according to set page, text and reader parameters in order to optimize reading speed and comprehension. Line breaks in the text are determined in part using semantic principles, i.e., the strength of the semantic relation between the words in a sentence. Other factors include the size of the page or screen (for both offline and online reading), and the width of the margins (which establish the maximum length of a line, depending on character font and size). The present invention increases reading comprehension over various other line break methods, including standard line breaks determined by page or screen layout, random truncation (i.e., truncating a line randomly before a standard random line break), or VTSF text truncated according to syntactic units (i.e., sentence structure).

In one exemplary embodiment, the invention inserts dynamic line breaks according to meaningful relationships between words, using word order frequencies and breaking a line when the word order frequency reaches an established threshold. The threshold, and thus the line breaks, can be set according to the page width available. If a page or screen only allows for a limited number of words on a line, for example, the semantic threshold can be set higher so that line breaks occur earlier or more frequently. This is of importance for personal digital assistants (PDAs), smart phones, and similar devices (e.g., iPods, iPads, and other reading devices), where a line can typically hold only a limited readable characters. For example, some PDAs may only be able to show 45-50 characters per line. Thus, any given text may have line breaks at different points, depending on the device or means used for reading the text.

Line breaks also can be established for different languages. The word order frequencies can be determined based upon large amounts of readily available text in the language.

Line breaks also can be adjusted based on reading level. A reader with a higher reading proficiency may set a higher threshold, while a reader with reading difficulties (as a result of visual impairment, language proficiencies, and the like) may benefit from a lower threshold. Similarly, the line breaks can be adjusted based on text subject matter or difficulty. Thus, a threshold may be dynamically adjusted to compensate for a more challenging text. Depending on the reading device, the user or reader may be able to adjust the threshold while reading the text, thus dynamically adjusting line breaks according to personal preferences.

In one exemplary embodiment, the system comprises a computer program implemented by a computer microprocessor on a computing device. The computer program received the raw text as input, implements a line break algorithm to analyze the raw text and determine line breaks based upon word order frequencies and page, text, and user parameters. The latter parameters include, but are not limited to, the size of the page, margin width, size and font of text, text language, difficulty of the text, and reader proficiency. The program then transforms the raw text by inserting suitable line break formatting.

In one embodiment, the method of the present invention comprises the following steps:

1. A large database of general language is created. In general, results are better with larger bodies of text. If the text whose layout is to be changed is in a specific domain (e.g., medicine) and if the readership consist of experts in the domain (e.g., medical students, physicians), a database of specialized language can be created.

2. Word-based bigram frequencies are computed from word co-occurrences in the database. In general, bigrams are groups of two written letters, two syllables, or two words. The system of the present invention analyzes the text in the database, and determines the frequency for pairs of adjacent words. Some frequencies will be higher (e.g., and-the), whereas others will be lower (e.g., laborers-that). The log frequency of the bigrams is used for the following step.

3. The text to be formatted is loaded by the system. The system parses the text, automatically assigning line breaks between a pair of words when the word co-occurrence frequency for that word pair is below a certain threshold, subject to the maximum line length (which may vary, depending on the form in which the text will be printed or read). In one embodiment, the threshold is determined by Maximum Likelihood Estimation, whereby the bigram frequency is divided by the corresponding unigram frequency. If no co-occurrence frequency for a word pair is below a certain threshold when the maximum line length is reached, the line break may be placed prior to the word that would exceed the maximum line length, between the last word pair, between the word pair with the lowest co-occurrence frequency, or randomly.

The system may assign line breaks based on default settings, or the user or other person may set parameters for the size of the page or screen on which the text will be printed or read, the width of margins, the level of difficulty of the text, and/or the level of readership. The threshold may be pre-set or default, calculated based upon the above parameters, or may be directly adjusted.

An example of a text with line breaks applied in accordance with this method is shown in FIG. 2. In this example, the bigram frequency for each word pair is determined using a large body of text (in the current example, 25 GB of text) and divided by the unigram frequency of the first word in the bigram. The result is the probability that the first word precedes the second word. For instance, "biochemical instructions" yields a probability of 0.0002, whereas the "composed of" yields a probability of 0.6388. In this example the threshold is set at 0.0004. If the probability of two words co-occurring in a specific order is less than 0.0004 then a line break is applied.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, Perl and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices as described above. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method of inserting line breaks in text, comprising the steps of:

receiving a text as input into a computer memory;

analyzing, using a computer microprocessor coupled to the computer memory, the text to determine the word co-occurrence frequency between adjacent words in the text;

determining a maximum line length for display of the text;

inserting, using a computer microprocessor coupled to the computer memory, one or more line breaks in the text between two adjacent words in the text where the word co-occurrence frequency for the two adjacent words is equal to or below a threshold limit, determined by the bigram frequency of the two adjacent words divided by the corresponding unigram frequency of the first word in the pair of adjacent words; and inserting a line break in the text if the maximum line length is reached.

2. The method of claim 1, wherein the maximum line length, threshold limit, or both are based in part on the size of the page or screen on which text will be displayed.

3. The method of claim 1, wherein the maximum line length, threshold limit, or both are based in part on the language of the text.

4. The method of claim 1, wherein the maximum line length, threshold limit, or both are based in part on reading proficiency levels.

5. The method of claim 1, wherein the maximum line length, threshold limit, or both are based in part on text subject matter.

6. The method of claim 1, wherein the maximum line length, threshold limit, or both are based in part on the difficulty of the text.

7. The method of claim 1, wherein the maximum line length, threshold limit, or both can be adjusted while the text is being read.

8. The method of claim 1, further comprising the step of outputting a processed text with inserted line breaks.

9. A non-transitory computer-readable storage medium with an executable program stored thereon, wherein the program instructs a microprocessor to perform the following steps:

receiving a text as input;

analyzing the text to determine the word co-occurrence frequency between adjacent words in the text;

determining a maximum line length for display of the text;

inserting one or more line breaks in the text between two adjacent words in the text where the word co-occurrence frequency for the two adjacent words is equal to or below a threshold limit, determined by the bigram frequency of the two adjacent words divided by the corresponding unigram frequency of the first word in the pair of adjacent words; and inserting a line break in the text if the maximum line length is reached.

10. The medium of claim 9, wherein the microprocessor further performs the step of outputting a processed text with inserted line breaks.

* * * * *